United States Patent Office 2,869,896
Patented Jan. 20, 1959

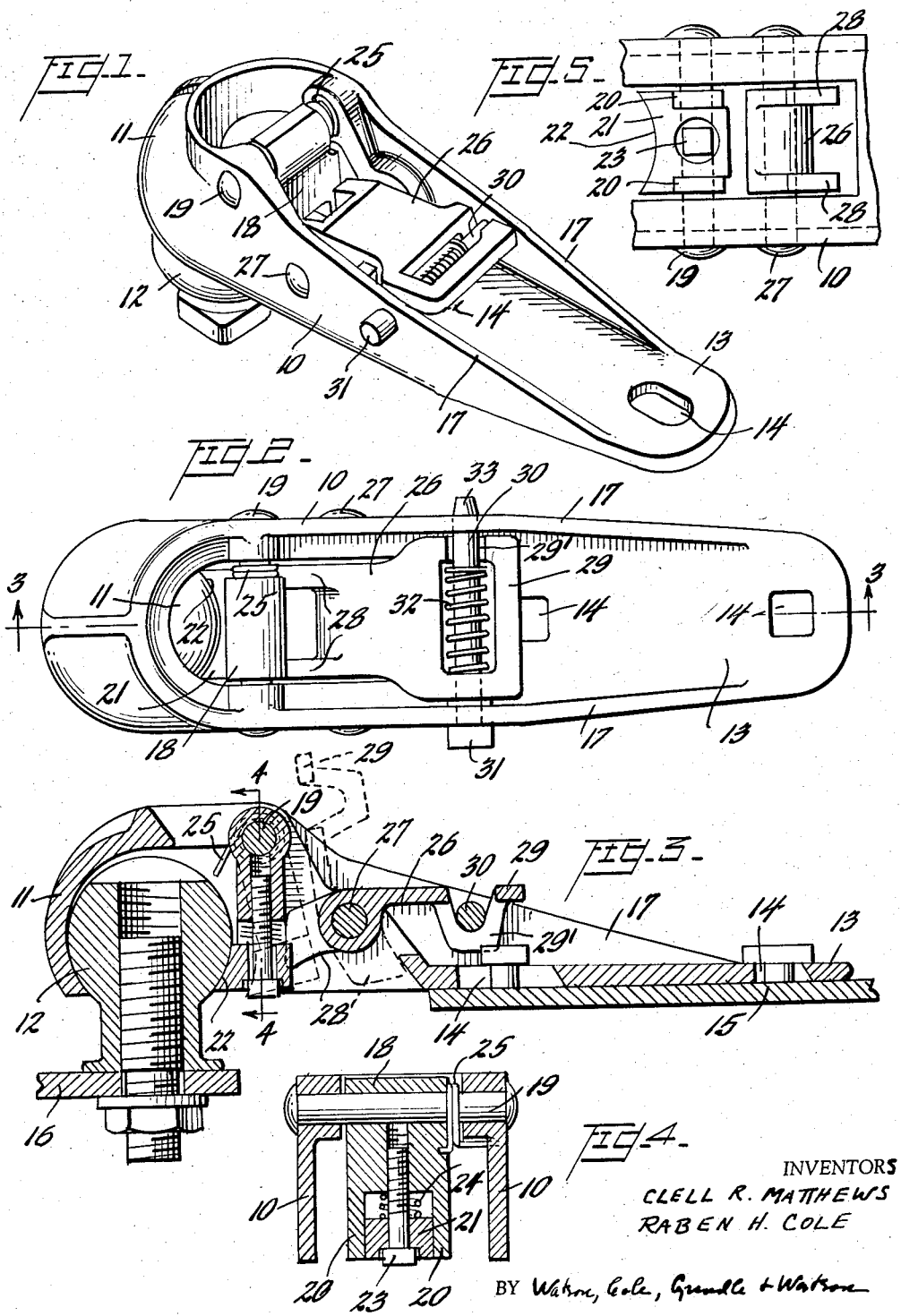

2,869,896

TRAILER COUPLER

Clell R. Matthews, Warsaw, and Raben H. Cole, Fort Wayne, Ind., assignors to The Dalton Foundries, Inc., Warsaw, Ind., a corporation of Indiana Application December 23, 1957, Serial No. 704,589

2 Claims. (Cl. 280—512)

The present invention pertains to a coupler of the kind used with a ball type of pintle for towing a trailer behind an automobile or truck or other vehicle.

All couplers of this kind contain a member which holds the ball between it and the wall of the coupler socket. The manner by which this member is operated, either to grip the ball or to release it so that it may be withdrawn from the socket, requires a mechanism of several pieces one of which in one kind of coupler is an operating lever part of which acts as a cam to tighten or to release the ball clamp. In the past this operating lever and much of the other mechanism have customarily been placed outside of the coupler housing itself, generally on the top thereof, often with the cam portion of the lever bearing against the coupler housing itself. The ball clamp is usually worked, in such designs, by a connecting member between it and the operating lever, which member, together with the means for locking the operating lever in its holding position, is very often in large part also outside of the housing proper.

The present invention eliminates this connecting member so that the operating lever acts directly against the ball clamp and the entire operating mechanism is contained within the coupler housing itself. This means that not only is the present device simpler, with fewer parts, but is much safer because it eliminates the chance that a blow from some source might break or release an exposed operating lever, permitting the ball and coupling to come apart. This is very important from a safety standpoint.

Couplers of the ball type require some means for adjusting the clamp to fit against the ball, as the latter often rusts and thus increases in diameter, or the two parts wear against each other and become loose. This adjustment in the past has usually been performed by varying the position of the operating lever and/or the entire ball clamp. In the present invention, however, the adjustment is independent of the other parts of the mechanism. This is accomplished by making the ball clamp in two parts, that part actually bearing against the ball being adjustable with regard to the other part so that not only can it be adjusted without change in the locking position of the cam and/or other parts, but the former portion can be replaced easily and cheaply in the event of breakage or extreme wear.

Finally, the present invention embodies a very simple and fool proof safety lock for the operating lever which is instantly releasable but at the same time impossible to release accidentally. In many of the prior couplers the safety catch is so exposed that an inadvertent blow could trip it.

Accordingly the primary object of the present invention is the provision of a coupler of simple but sturdy mechanism wherein the operating lever operates directly against the ball clamp without the interposition of any other connecting member between them.

A further object is to provide a coupler wherein the entire operating mechanism is contained within the coupler housing proper whereby such mechanism is protected from blows which might break or release it.

An additional object of the present invention is to provide the ball clamp with a means of adjustment which is independent of the rest of the mechanism, particularly which is independent of the operating lever.

A further object of the invention is the provision of a new type of safety lock for the operating lever which makes its accidental release impossible.

Other and further objects, features and advantages will be apparent from the description of the preferred form of the invention which follows, read in connection with the accompanying drawings in which:

Figure 1 is a perspective view.

Figure 2 is a top plan view of the coupler.

Figure 3 is a section view taken along the line 3—3 of Figure 2.

Figure 4 is a section view of the ball clamp taken along the line 4—4 of Figure 3.

Figure 5 is a bottom plan view of a portion of the coupler showing the relationship of the ball clamp to the operating and cam lever.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to the drawings, the housing 10 is preferably of one piece, cast from a suitable grade of iron. One end is formed to provide socket 11 for the other half of the coupler, the ball type pintle 12. The other end 13 of the housing is tongue shaped and provided with holes 14 for securing the coupler to a portion 15 of the towing or towed vehicle, as the case may be. The ball, of course, is secured by suitable means to a portion 16 of the other vehicle. The housing is strengthened by flanges 17, on each side of tongue 13, which blend into socket portion 11.

As shown in Figures 1, 2 and 3, the ball clamp comprises two parts: pivoted member 18, pivoted at one end on pivot 19, within housing 10 adjacent socket 11 and bifurcated at the other end as indicated at 20, and retaining member 21 slideably mounted between forks 20 and provided with a ball engaging surface 22, this surface being concentric with ball 12, when the latter is placed within socket 11 and surface 22 is thereagainst. Retaining member 21 is secured to pivoted member 18 between forks 20 thereof by bolt 23 which is threaded into pivoted member 18. A compression spring 24 is interposed between retaining member 21 and pivoted member 18, as shown in Figures 3 and 4, to maintain retaining member 21 in the position to which it is adjusted by bolt 23.

A torsion spring 25 is wound about pin 19, one end being secured to housing 10 and the other to pivoted member 18 in such a manner that the spring tension tends to swing pivoted member 18 away from socket 11 to its released position, shown by broken lines in Figure 3. In this position ball 12 may be easily inserted or withdrawn from socket 11 without interference from the ball clamp. It will be appreciated that the ball clamp is located within housing 10 so that, when it is pivoted about pin 19 toward and against ball 12 within socket 11, surface 22 will engage the ball on the lower portion thereof so that the latter is retained between surface 22 and the wall of socket 11.

Operating lever 26 is also pivotally mounted within housing 10 on pin 27 so that the ball clamp lies between it and socket 11 (see Figures 1, 2 and 3). Lever 26 is bifurcated at one end, as indicated at 28, the two forks 28 being positioned directly behind the corresponding forks 20 of pivot member 18 (see Figure 5), so that forks 28 act as cams and engage the forks 20 to move the ball clamp toward socket 11 when operating lever 26 is pivoted about pin 27. The locking end 29 of lever 26 is fashioned as shown in Figures 1, 2 and 3, in such manner that when cam forks 28 have engaged forks 20 and moved the ball clamp against ball 12, locking end 29 sinks between and below the tops of flanges 17, so that it is protected against an accidental blow which might break or release it.

Part of locking end 29 is formed with a depressed portion 29, as shown in Figures 1, 2 and 3, to cooperate with locking pin 30. Locking pin 30 runs freely through flanges 17, and at one end thereof has a head and finger grip 31, larger than the shank portion of the pin. One end of spring 32 is secured near one end of pin 30 and the other end bears on the inner surface of one of flanges 17, as shown in Figure 2, so that when head 31 is gripped and pulled, pin 30 is withdrawn and spring 32 compressed far enough to permit end 33 to clear depressed portion 29 of locking end 29, whereby the latter can be raised from between flanges 17 and thus the ball clamp released. This permits a very simple but very positive lock for operating lever 26 and one which can be very quickly engaged or disengaged.

From the foregoing description the method of operation of the coupler is readily apparent. Operating lever 26 is released by disengaging it from pin 30 in the manner just explained and then is swung upward to its released position shown in broken lines in Figure 3. This permits spring 25 to swing the ball clamp, that is, pivoted member 18 and retaining member 21, away from socket 11 to the position shown in broken lines, also in Figure 3. Ball 12 is then inserted in socket 11. Lever 26 is then swung down and locked between flanges 17 by pin 30. The downward motion of lever 26 causes cam forks 28 thereof to engage forks 20 of the ball clamp, swinging the latter about pin 19 and against the resistance of spring 25 until surface 22 engages ball 12, locking the latter in socket 11.

Changes of diameter in ball 12 or in surface 22 on account of rust wear, or other reason, are compensated for by adjustment of retaining member 21 along forks 20 by turning bolt 23 one way or the other. In this way adjustment can be made independent of operating lever 26 so that the locking position of this lever never varies, regardless of any change which may occur in the operative relationship between ball 12 and surface 22. It also permits retaining member 21 easily to be replaced in case of its breakage or extreme wear.

Having thus described the invention, what is claimed as new and desired to be secured by Letters Patent is:

1. A trailer coupler of the ball and socket type comprising a housing having a ball receiving socket in one end thereof and having provision at the other end thereof for attaching said housing to a vehicle, a ball clamp within said housing having one end thereof pivoted transversely of said housing and the other end thereof having a concave shaped ball engaging surface therein substantially concentric with the ball when said surface is against the ball, said clamp being positioned adjacent said socket so that rotation of said other end in one direction about its pivot axis moves said surface toward and against a ball positioned in said socket and retains the ball between said surface and the wall of said socket, spring means tending to pivot said clamp away from the wall of said socket, an operating lever having a cam end and a locking end and being pivoted transversely of said housing adjacent said clamp so that said cam end directly engages said other end of said clamp and urges it and said surface toward and against a ball in said socket when said locking end is rotated in one direction about its pivot axis, said locking end being adapted to be substantially contained within said housing when said cam end has moved said engaging surface against the ball, means locking said locking end within said housing, said ball clamp comprising a pivoted member bifurcated at one end thereof and pivoted transversely of said housing at the other end thereof adjacent said socket, a ball engaging member slidably mounted between the forks of said pivoted member so that said engaging member is movable along said forks, said engaging member having a concave shaped ball retaining surface therein substantially concentric with a ball in said socket when said surface is against the ball, means for adjusting the position of said engaging member along said forks whereby wear of said surface and the ball is compensated for, and wherein said cam end of said operating lever is bifurcated, the two forks thereof engaging said forks of said pivoted member.

2. A trailer coupler of the ball and socket type comprising a housing having a ball receiving socket in one end thereof and having provision at the other end thereof for attaching said housing to a vehicle, a ball clamp within said housing having one end thereof pivoted transversely of said housing and the other end thereof having a concave shaped ball engaging surface therein substantially concentric with the ball when said surface is against the ball, said clamp being positioned adjacent said socket so that rotation of said other end in one direction about its pivot axis moves said surface toward and against a ball positioned in said socket and retains the ball between said surface and the wall of said socket, spring means tending to pivot said clamp away from the wall of said socket, an operating lever having a cam end and a locking end and being pivoted transversely of said housing adjacent said clamp so that said cam end directly engages said other end of said clamp and urges it and said surface toward and against a ball in said socket when said locking end is rotated in one direction about its pivot axis, said locking end being adapted to be substantially contained within said housing when said cam end has moved said engaging surface against the ball, means locking said locking end within said housing, said ball clamp comprising a pivoted member bifurcated at one end thereof and pivoted transversely of said housing at the other end thereof adjacent said socket, a ball engaging member slidably mounted between the forks of said pivoted member so that said engaging member is movable along said forks, said engaging member having a concave shaped ball retaining surface therein substantially concentric with a ball in said socket when said surface is against the ball, means for adjusting the position of said engaging member along said forks whereby wear of said surface and the ball is compensated for, and wherein said cam end of said operating lever is bifurcated, the two forks thereof engaging said forks of said pivoted member, said adjusting means comprising a retainer element through said engaging member and into threaded engagement with said pivoted member, and a spring means interposed between said engaging member and said pivoted member for urging them apart.

References Cited in the file of this patent

UNITED STATES PATENTS

| | | |
|---|---|---|
| 2,125,611 | Hennicke | Aug. 2, 1938 |
| 2,613,948 | Klien | Oct. 14, 1952 |
| 2,693,970 | Coleman et al. | Nov. 9, 1954 |